United States Patent
Lee et al.

(10) Patent No.: US 12,541,300 B2
(45) Date of Patent: Feb. 3, 2026

(54) COMPUTATIONAL STORAGE DEVICE AND STORAGE SYSTEM INCLUDING THE COMPUTATIONAL STORAGE DEVICE

(71) Applicant: SAMSUNG ELECTRONICS CO., LTD., Suwon-si (KR)

(72) Inventors: Hwang Lee, Seoul (KR); Jung Min Seo, Seongnam-si (KR); Wan Heo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 531 days.

(21) Appl. No.: 17/689,049

(22) Filed: Mar. 8, 2022

(65) Prior Publication Data

US 2023/0084539 A1 Mar. 16, 2023

(30) Foreign Application Priority Data

Sep. 10, 2021 (KR) .................. 10-2021-0121030

(51) Int. Cl.
*G06F 9/48* (2006.01)
*G06F 3/06* (2006.01)
(Continued)

(52) U.S. Cl.
CPC .......... *G06F 3/061* (2013.01); *G06F 3/0658* (2013.01); *G06F 3/0659* (2013.01);
(Continued)

(58) Field of Classification Search
CPC ...... G06F 3/061; G06F 3/0658; G06F 3/0659; G06F 3/0679; G06F 12/0523;
(Continued)

(56) References Cited

U.S. PATENT DOCUMENTS 9,430,376 B2 8/2016 Horn
9,465,737 B1 * 10/2016 Karmarkar .......... G06F 12/0893
(Continued)

FOREIGN PATENT DOCUMENTS

JP 2008-59052 A 3/2008
JP 2013-125296 A 6/2013
(Continued)

OTHER PUBLICATIONS

Fleming, "A thorough introduction to eBPF", LWN.net, Dec. 2, 2017, pp. 1-8 (Year: 2017).*
(Continued)

*Primary Examiner* — Charles M Swift
(74) *Attorney, Agent, or Firm* — Sughrue Mion, PLLC

(57) ABSTRACT

A computational storage device is provided. The computation storage device includes: a nonvolatile memory configured to store data; and a storage controller configured to control a plurality of applications to be executed based on the data. The storage controller includes: a processor; and a memory including a program slot configured to store a user program. The processor is configured to drive an operating system to execute the user program to control an application among the plurality of applications to perform a first operation on the data based on an event signal.

20 Claims, 17 Drawing Sheets

(51) Int. Cl.
*G06F 9/50* (2006.01)
*G06F 12/02* (2006.01)
*G06F 13/16* (2006.01)
*G06F 8/61* (2018.01)
*G06F 9/445* (2018.01)

(52) U.S. Cl.
CPC .............. *G06F 3/0679* (2013.01); *G06F 9/48* (2013.01); *G06F 9/5027* (2013.01); *G06F 12/0253* (2013.01); *G06F 13/1668* (2013.01); *G06F 8/61* (2013.01); *G06F 9/44505* (2013.01); *G06F 9/4812* (2013.01); *Y02D 10/00* (2018.01)

(58) Field of Classification Search
CPC .. G06F 13/1668; G06F 8/061; G06F 9/44505; G06F 9/48; G06F 9/4812; G06F 9/5027
See application file for complete search history.

(56) References Cited

U.S. PATENT DOCUMENTS

| | | | |
|---|---|---|---|
| 9,619,167 | B2 | 4/2017 | Khan et al. |
| 10,387,303 | B2 | 8/2019 | Mehra et al. |
| 2017/0331901 | A1* | 11/2017 | Sarlandie de la Robertie ............ G06F 1/163 |
| 2019/0073280 | A1* | 3/2019 | Carson ................. G06F 9/54 |
| 2020/0104056 | A1 | 4/2020 | Benisty et al. |

FOREIGN PATENT DOCUMENTS

| | | |
|---|---|---|
| KR | 10-2015-0100100 A | 9/2015 |
| KR | 10-2019-0105497 A | 9/2019 |

OTHER PUBLICATIONS

Miano et al, "A Framework for eBPF-Based Network Functions in an Era of Microservices", IEEE Transactions on Network and Service Management, vol. 18, No. 1, Mar. 2021, pp. 133-151 (Year: 2021).*
Molgaard Jason, "Simple Approach to implementing Computational Storage Solutions Architect Arm", SDC, XP 55878458, dated Sep. 2019, 25 pages total.
Lerner, et al, "Not your Grandpa's SSD: The Era of Co-Designed Storage Devices", SIGMOD, XP 58888196, Jun. 2021, 7 pages total.
Shadley, et al, "What happens when Compute meets Storage?", Computational Storage, XP 55878459, Sep. 2019, 28 pages total.
European Office Action dated Jan. 20, 2023, issued by the European Patent Office, Application No. 22194360.8.
European Search Report dated Jan. 10, 2023, issued by the European Patent Office, Application No. 22194360.8.
"Computational Programs Command Set Specification", NVM Express, Apr. 2021, 51 pages total.
"NVMe Computational Storage Task Group: Inline Operations", NVM Express, Oct. 2020, 8 pages total.

* cited by examiner

FIG. 6

GC with LBA Filtering

```
enum bpf_PgmZ
{
   GC_drop,
   GC_copy,
};
bpf_PgmZ  bpf_gc_rangefilter(unsigned long long int LBA)
{
   if (40000 > LBA) return GC_copy;
   else return GC_drop;
}
```

COMPUTATIONAL STORAGE DEVICE AND STORAGE SYSTEM INCLUDING THE COMPUTATIONAL STORAGE DEVICE

This application claims the benefit of Korean Patent Application No. 10-2021-0121030, filed on Sep. 10, 2021 in the Korean Intellectual Property Office, the disclosure of which is incorporated herein in its entirety by reference.

BACKGROUND

1. Field

The present disclosure relates to a computational storage device and a storage system including the computational storage device.

2. Description of Related Art

Semiconductor memories may be classified into volatile memories, such as static random access memories (SRAMs) and dynamic random access memories (DRAMs), and nonvolatile memories such as flash memories, phase-change random access memories (PRAMs), magnetic random access memories (MRAMs), resistive random access memories (RRAMs), and ferroelectric random access memories (FRAMs). Volatile memories lose stored data when the power supply is cut off, whereas nonvolatile memories retain stored data even when the power supply is cut off.

A storage device based on flash memory may be used as a mass storage medium in a computing system. A general storage device has a function of storing data under the control of a host device. Recently, in order to reduce the computational load of the host device, storage devices supporting various computational operations or various applications in the storage devices have been developed.

SUMMARY

Aspects of the present disclosure provide a computational storage device which performs various computational operations using a user program that applies an internal operation.

Aspects of the present disclosure also provide an electronic system including a computational storage device which performs an internal operation according to an execution condition provided by a host device.

However, aspects of the present disclosure are not restricted to those set forth herein. The above and other aspects will become more apparent to one of ordinary skill in the art to which the present disclosure pertains by referencing the detailed description of the present disclosure given below.

According to an aspect of the present disclosure, a computational storage device includes: a nonvolatile memory configured to store data; and a storage controller configured to control a plurality of applications to be executed based on the data. The storage controller includes: a processor; and a memory including a program slot configured to store a user program. The processor is configured to drive an operating system to execute the user program to control an application among the plurality of applications to perform a first operation on the data based on an event signal.

According to another aspect of the present disclosure, a computational storage device includes: a nonvolatile memory configured to store data; a storage controller configured to control a plurality of applications to be executed based on the data; and a processor configured to reconfigure an event handler according to an external command, control the event handler to identify an application among the plurality of applications according to an execution condition included in the external command, and execute the application according to the execution condition. The storage controller is further configured to reconfigure the processor according to the external command.

According to another aspect of the present disclosure, there is provided an electronic system including: a nonvolatile memory configured to store data; a storage controller which includes a processor and a memory including a program slot configured to store a user program executed by an internal operating system; and a host device configured to provide a download command for the user program to the storage controller. The internal operating system is configured to store the user program in the program slot based on the download command, execute the user program to control an application among a plurality of applications to perform a first operation on the data.

Other features and advantages may be apparent from the following detailed description, the drawings and the claims.

BRIEF DESCRIPTION OF THE DRAWINGS

These and/or other aspects will become apparent and more readily appreciated from the following description of example embodiments, taken in conjunction with the accompanying drawings in which:

FIGS. 5 through 10 are diagrams for explaining operation of the storage system of FIG. 2 according to example embodiments;

DETAILED DESCRIPTION

Figure 1:
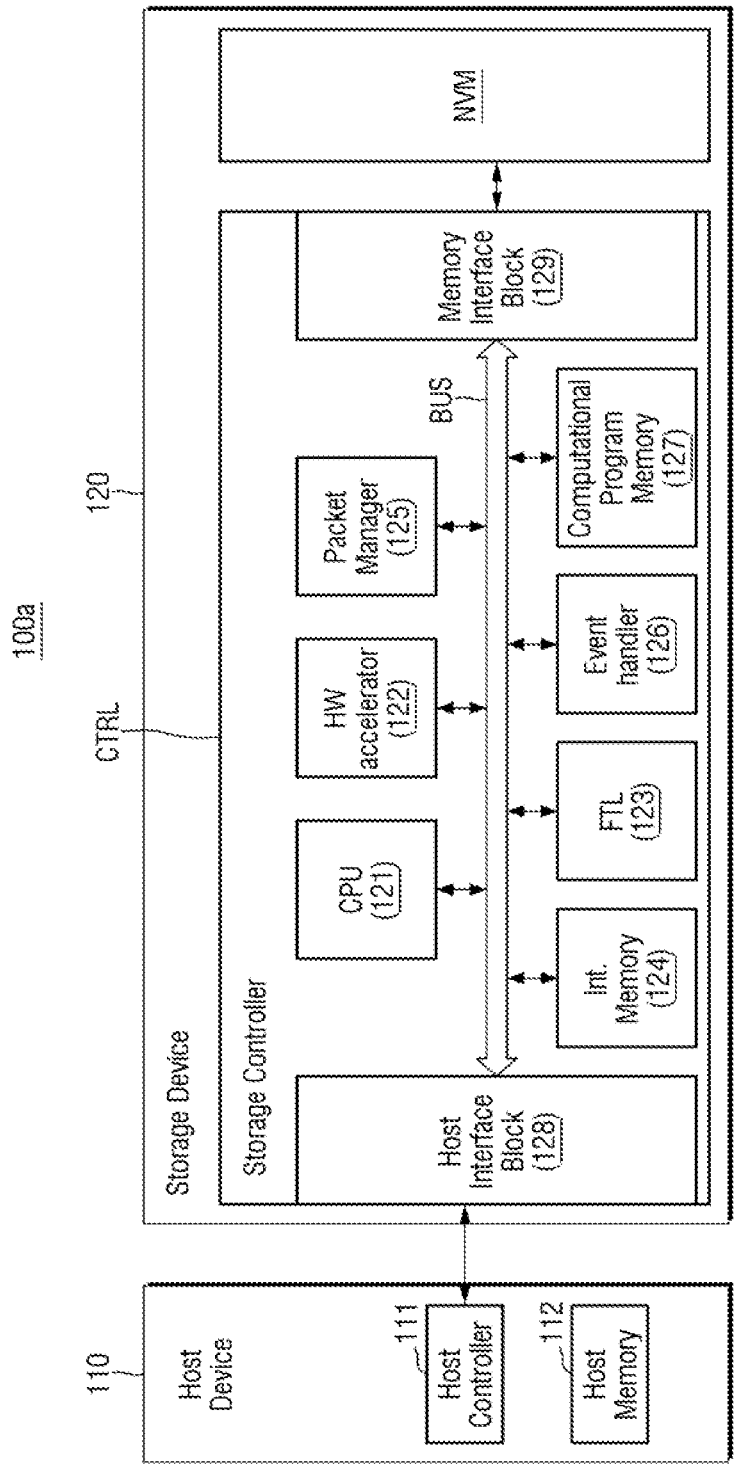
FIG. 1 is a block diagram of a storage system according to example embodiments.

Hereinafter, example embodiments will be described with reference to the accompanying drawings. In the description of FIGS. 1 through 17, substantially the same components are identified by the same reference characters, and any redundant description thereof will be omitted. In addition, similar components are identified by similar reference characters throughout the drawings.

FIG. 1 is a block diagram of a storage system 100*a* according to example embodiments. Referring to FIG. 1, the storage system 100*a* may include a host device 110 and a storage device 120. In an example embodiment, the storage system 100a may be a mobile system such as a portable communication terminal (mobile phone), a smartphone, a tablet personal computer, a wearable device, a healthcare device, or an Internet of things (IOT) device. In an example embodiment, the storage system 100a may be a computing device such as a personal computer, a laptop computer, a server or a media player or may be an automotive device such as a navigation device.

In an example embodiment, the storage device 120 may be a computational storage device configured to perform various computational operations in addition to general functions (e.g., data storage and output) of a storage device. For ease of description, terms of a storage device and a computational storage device will be used together below.

The host device 110 may store data in the storage device 120 or may read data stored in the storage device 120. The host device 110 may include a host controller 111 and a host memory 112. The host controller 111 may be configured to control the storage device 120. In an example embodiment, the host controller 111 may communicate with the storage device 120 based on a predetermined interface. The predetermined interface may be an interface based on a nonvolatile memory express (NVMe) standard, but example embodiments are not limited thereto.

The host memory 112 may include a buffer memory, a working memory, and/or a system memory of the host device 110. For example, the host memory 112 may be configured to store various information needed for the operation of the host device 110. The host memory 112 may be used as a buffer memory for temporarily storing data to be transmitted to the storage device 120 or data received from the storage device 120. In an example embodiment, the host memory 112 may support access by the storage device 120.

In an example embodiment, each of the host controller 111 and the host memory 112 may be implemented as a separate semiconductor chip. Alternatively, in an example embodiment, the host controller 111 and the host memory 112 may be integrated on a single semiconductor chip or may be implemented as a multi-chip package. For example, the host controller 111 may be any one of a plurality of modules included in an application processor. The application processor may be implemented as a system-on-chip (SoC). The host memory 112 may be an embedded memory included in the application processor or may be a nonvolatile memory device, a volatile memory device, a nonvolatile memory module, or a volatile memory module disposed outside the application processor.

The storage device 120 may be a storage medium configured to store data or output stored data according to a request from the host device 110. In an example embodiment, the storage device 120 may include at least one of a solid state drive (SSD), an embedded memory, and a removable external memory. When the storage device 120 is an SSD, it may be a device conforming to the NVMe standard. When the storage device 120 is an embedded memory or an external memory, it may be a device conforming to a universal flash storage (UFS) standard or an embedded multi-media card (eMMC) standard. Each of the host device 110 and the storage device 120 may generate and transmit a package according to an adopted standard protocol.

The storage device 120 may include a storage controller CTRL and a nonvolatile memory device NVM. The storage controller CTRL may include a central processing unit (CPU) 121, a hardware accelerator 122, a flash translation layer (FTL) 123, an internal memory 124, a packet manager 125, an event handler 126, a computational program memory 127, a host interface block 128, a memory interface block 129, and a system bus BUS. In an example embodiment, each of the various components included in the storage controller CTRL may be implemented as an intellectual property (IP) block or a functional block and may be implemented in the form of software, hardware, firmware, or a combination of the same. For example, an IP block may include circuitry to perform specific functions, and may have a design that includes a trade secret.

The CPU 121 may be a processor and may control the overall operation of the storage controller CTRL. For example, the CPU 121 may be configured to drive various firmware or software running on the storage controller CTRL.

The hardware accelerator 122 may be configured to perform various computational operations executed by the storage controller CTRL or to drive an application or a computational program executed on the storage controller CTRL. In an example embodiment, the hardware accelerator 122 may be configured to perform some functions of a host application running on the host device 110. In an example embodiment, an internal application may be configured to perform various data computational operations such as an encryption operation, a filtering operation, and a convolution operation for machine learning.

In an example embodiment, the CPU 121 and the hardware accelerator 122 are illustrated as separate functional blocks, but example embodiments are not limited thereto. For example, each of the CPU 121 and the hardware accelerator 122 may be implemented as a separate processor core. Alternatively, the CPU 121 and the hardware accelerator 122 may be implemented as one processor core or may be implemented as a multi-core processor including a plurality of processor cores.

The FTL 123 may perform various maintenance operations for efficiently using the nonvolatile memory device NVM. For example, the maintenance operations may include an address mapping operation, a wear-leveling operation, and a garbage collection operation.

The address mapping operation may be an operation of converting or mapping between a logical address managed by the host device 110 and a physical address of the nonvolatile memory device NVM.

The wear-leveling operation may refer to an operation of equalizing the frequency of use or the number of times of use of a plurality of memory blocks included in the nonvolatile memory device NVM and may be implemented through firmware technology that balances erase counts of physical blocks or through hardware. In an example embodiment, because the memory blocks of the nonvolatile memory device NVM are evenly used through the wear-leveling operation, it is possible to prevent a specific memory block from being excessively degraded, thereby extending the life of the nonvolatile memory device NVM.

The garbage collection operation may refer to an operation of securing an available memory block or a free memory block of the nonvolatile memory device NVM by copying valid data of a victim memory block of the nonvolatile memory device NVM to a destination memory block and then erasing the victim memory block.

In an example embodiment, the FTL 123 may be implemented in the form of firmware or software and may be stored in the internal memory 124 or a separate working memory. The CPU 121 may perform the various maintenance operations described above by driving the FTL 123 stored in the internal memory 124 or the separate working memory. In an example embodiment, the FTL 123 may be implemented through various hardware automation circuits configured to perform the various maintenance operations described above. That is, the FTL 123 may be implemented as hardware, and the various maintenance operations described above may be performed through the hardware.

The internal memory 124 may operate as a buffer memory or a working memory of the storage controller CTRL. For example, the internal memory 124 may temporarily store data received from the host device 110 or the nonvolatile memory device NVM. Alternatively, the internal memory 124 may store various information or program codes needed for the operation of the storage controller CTRL. The CPU 121 may perform various operations based on the information or program codes stored in the internal memory 124.

In an example embodiment, the internal memory 124 may be configured to store data used by the hardware accelerator 122 or a program code for an application executed by the hardware accelerator 122 and a program slot to be described later. The hardware accelerator 122 may execute the program code stored in the internal memory 124 or may perform various operations on the data stored in the internal memory 124.

Although the internal memory 124 is illustrated as being included in the storage controller CTRL, example embodiments are not limited thereto. The internal memory 124 may also be a separate memory module or memory device located outside the storage controller CTRL. The storage controller CTRL may further include a memory controller configured to control the memory module or the memory device located outside the storage controller CTRL.

The packet manager 125 may be configured to parse a packet received from the host device 110 or generate a packet for data to be transmitted to the host device 110. In an example embodiment, a packet may be generated based on an interface protocol between the host device 110 and the storage device 120.

The event handler 126 generates an event signal to an internal operating system according to execution conditions of the functional blocks included in the storage controller CTRL, and the internal operating system executes a user program in a program slot according to the event signal.

Although the event handler 126 is illustrated as being included in the storage controller CTRL, example embodiments are not limited thereto. The storage controller CTRL may further include an event handler controller configured to control an event handler located outside the storage controller CTRL, and the event handler may be a separate chip or embedded field programmable grid arrays (FPGA).

The computational program memory 127 may be used as a buffer memory for temporarily storing data to be transmitted to the host device 110 or data received from the host device 110. In addition, the computational program memory 127 may receive and store file data from a host file system to be described later, and the internal operating system may execute a user program based on the stored file data.

The storage controller CTRL may communicate with the host device 110 through the host interface block 128. In order to easily describe example embodiments, the host interface block 128 will be described as supporting an interface conforming to the NVMe standard. However, example embodiments are not limited thereto, and the host interface block 128 may also be configured to support at least one of various interfaces such as an advanced technology attachment (ATA) interface, a serial-ATA (SATA) interface, an external SATA (e-SATA) interface, a small computer small interface (SCSI) interface, a serial attached SCSI (SAS) interface, a peripheral component interconnect (PCI) interface, a PCI express (PCIe) interface, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

The storage controller CTRL may communicate with the nonvolatile memory device NVM through the memory interface block 129. In an example embodiment, the memory interface block 129 may be configured to support a flash interface such as a toggle interface or an open NAND flash interface (ONFI) interface. However, example embodiments are not limited thereto.

Various components included in the storage controller CTRL may communicate with each other through the system bus BUS. Examples of the system bus BUS may include various system buses such as an advanced system bus (ASB), an advanced peripheral bus (APB), an advanced high performance bus (AHB), and an advanced extensible interface (AXI).

The nonvolatile memory device NVM may be configured to store data, output stored data, or erase stored data under the control of the storage controller CTRL. In an example embodiment, the nonvolatile memory device NVM may be a 2D or 3D NAND flash memory device. However, example embodiments are not limited thereto, and the nonvolatile memory device NVM may also be a memory device based on a magnetic random access memory (MRAM), a spin-transfer torque MRAM, a conductive bridging random access memory (CBRAM), a ferroelectric random access memory (FeRAM), a phase-change random access memory (PRAM), a resistive random access memory (RRAM), and various other types of memories. In an example embodiment, the nonvolatile memory device NVM may include a plurality of nonvolatile memories, and each of the nonvolatile memories may be implemented as a separate chip or a separate package. The storage controller CTRL may communicate with the nonvolatile memories of the nonvolatile memory device NVM through a plurality of channels, respectively.

As described above, the storage device 120 may perform various computational operations by executing various applications using the CPU 121 and the hardware accelerator 122 of the storage controller CTRL. In this case, the load of computation to be performed by the host device 110 may be reduced. Accordingly, the overall performance of the storage system 100a can be improved.

The storage controller CTRL may further include an error correction code (ECC) engine and an advanced encryption standard (AES) engine. The ECC engine may perform an error detection and correction function on data read from the nonvolatile memory device NVM. For example, the ECC engine may generate parity bits for write data to be stored in the nonvolatile memory device NVM. The generated parity bits may be stored in the nonvolatile memory device NVM together with the write data. Later, when a read operation is performed on the nonvolatile memory device NVM, the ECC engine may correct an error in read data using the read data and corresponding parity bits and may output the error-corrected read data.

The AES engine may perform at least one of an encryption operation and a decryption operation on data input to the storage controller CTRL by using a symmetric-key algorithm.

Figure 2:
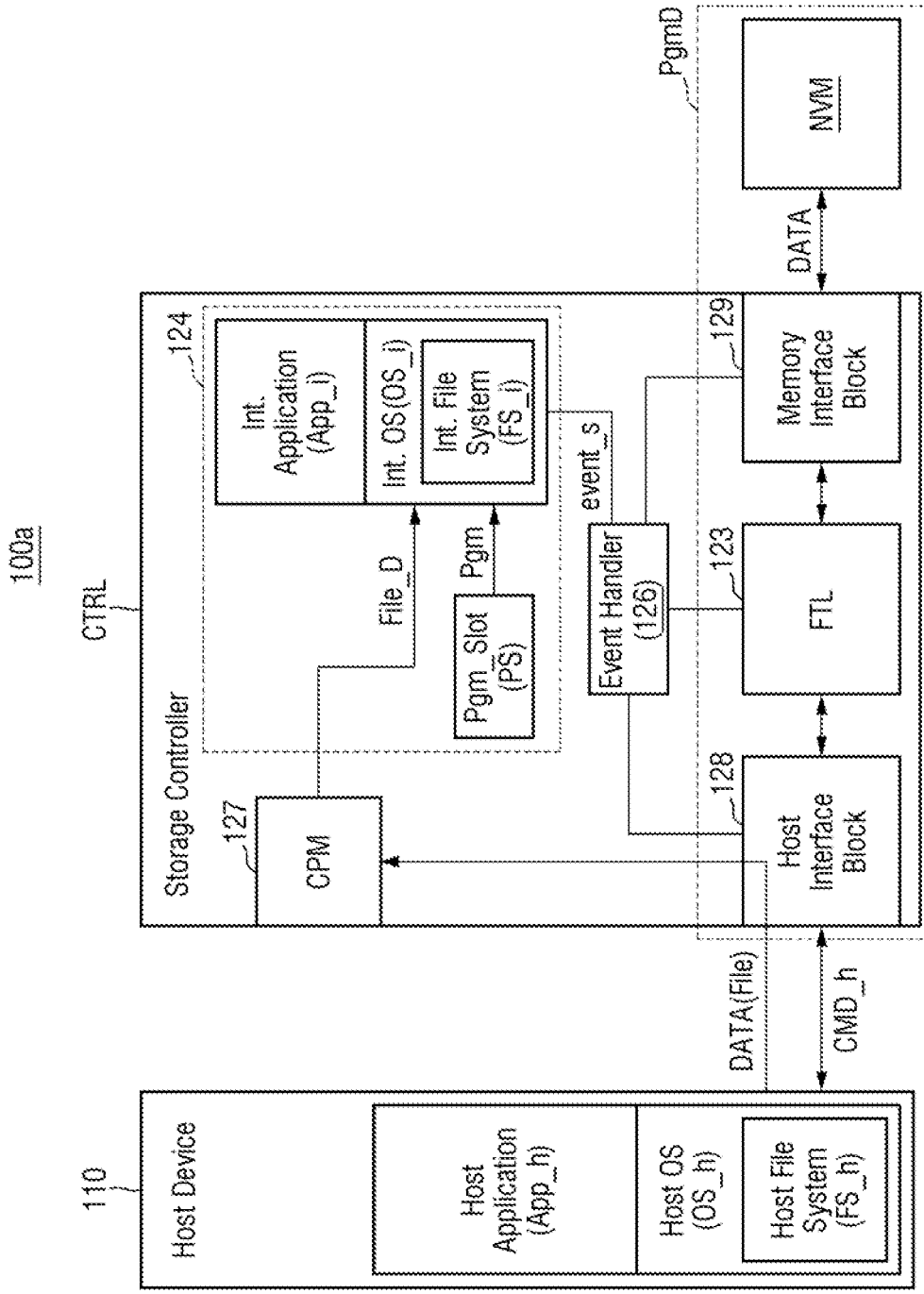
FIG. 2 is a block diagram of the storage system of FIG. 1 according to example embodiments.

FIG. 2 is a block diagram of the storage system 100a of FIG. 1. For ease of description, the description already provided with respect to FIG. 1 will not be repeated.

Referring to FIGS. 1 and 2, the storage system 100a may include the host device 110 and the storage device 120. Because the schematic configuration and operation of the host device 110 and the storage device 120 have been described above, a detailed description thereof will not be repeated.

In an example embodiment, the host device 110 may include a processor, and the processor may drive a host application APP_h. The host application APP_h may refer to a program executed on a host operating system OS_h. The host application APP_h may store data in the storage device 120 or may read data stored in the storage device 120. That is, the host application APP_h may issue a host command CMD_h for input/output (I/O) to/from the storage device 120. The I/O issued by the host application APP_h of the host device 110 will hereinafter be referred to as host I/O.

The host operating system OS h may include a host file system FS_h. The host file system FS_h running on the host operating system OS_h may be configured to manage or organize the storage space of the storage device 120. The host operating system OS_h may be connected to the storage device 120 through an interface based on the NVMe standard.

The host operating system OS_h according to some example embodiments sends data DATA about the host file system FS_h to the computational program memory 127 through the host interface block 128, and the computational program memory 127 provides file data File_D to an internal operating system OS_i based on the data DATA.

The storage device 120 may include the storage controller CTRL and the nonvolatile memory device NVM. The storage controller CTRL may include the FTL 123, the internal memory 124, the computational program memory 127, the host interface block 128, and the memory interface block 129. The storage controller CTRL may receive a host command from the host device 110 and perform an operation corresponding to the received host command.

For example, the host interface block 128 may include a physical port and an NVMe engine. The physical port may be a circuit or physical layer configured to transmit and receive a physical signal according to a PCIe protocol, and the NVMe engine may be configured to process a signal received through the physical port. In an example embodiment, the NVMe engine may be an NVMe controller that provides an interface between the host device 110 and the storage device 120 (or an NVM subsystem) or may be a physical functional block configured to support an NVMe interface.

The FTL 123 may receive a signal from the NVMe engine and perform various maintenance operations based on the received signal. Because the operation of the FTL 123 has been described above, a detailed description thereof will not be repeated. The FTL 123 may read data stored in the nonvolatile memory device NVM or store data in the nonvolatile memory device NVM through the memory interface block 129.

As described above, the host I/O generated by the host application APP_h of the host device 110 may be processed through the host file system FS_h, the host interface block 128, the FTL 123, and the memory interface block 129.

In an example embodiment, the storage device 120 may be configured to perform various computational operations by executing an internal application APP_i. For example, the storage controller CTRL of the storage device 120 may execute the internal application APP_i. The internal application APP_i may be executed on an internal operating system or firmware (hereinafter, referred to as an "internal operating system") OS_i. Then, the internal application APP_i may be executed as a user program Pgm. The internal application APP_i and the internal operating system OS_i may be driven by the CPU 121 and the hardware accelerator 122 described with reference to FIG. 1.

In an example embodiment, the internal application APP_i and the internal operating system OS_i running on the storage controller CTRL may be different from the host application APP_h and the host operating system OS_h running on the host device 110. For example, the internal application APP_i may be physically or logically separated from the host operating system OS_h (and the host application APP_h), and the internal operating system OS_i may be physically or logically separated from the host operating system OS_h. Alternatively, the internal application APP_i and the internal operating system OS_i may be driven by components (e.g., the CPU 121 and the hardware accelerator 122 of the storage controller CTRL) inside the storage device 120, and the host application OS_h and the host operating system OS_h may be driven by a component (e.g., the processor of the host device 110) inside the host device 110. In addition, program codes for the internal application APP_i and the internal operating system OS_i may be stored in the internal memory 124, and the program codes may be driven to control the internal application APP_i and the internal operating system OS_i.

In an example embodiment, the internal application APP_i and the internal operating system OS_i may be different from programs required to perform a storage function of the storage controller CTRL. The storage function of the storage controller CTRL may refer to the function of writing data, reading data, or managing the storage space of the nonvolatile memory device NVM in response to a host command from the host device 110. That is, the storage device 120 according an example embodiment may further include the internal application APP_i and the internal operating system OS_i compared with a related storage device, and thus may be configured to perform an additional computational operation.

The internal operating system OS_i may determine and execute a user program Pgm stored in a program slot PS in the internal memory 124 based on an event signal event s provided from the event handler 126, and the user program Pgm may be executed based on the file data File_D stored in the computational program memory 127.

As the internal operating system OS_i executes the user program Pgm, it may execute at least one internal application APP_i including the above general storage function.

As the internal application APP_i is executed, I/O may be issued from the internal application APP_i. The I/O issued by the internal application APP_i will hereinafter be referred to as internal I/O. The internal I/O issued by the internal application APP_i may be sent to the FTL 123 through an internal file system FS_i of the internal operating system OS_i. In an example embodiment, the internal file system FS_i may be a component managed or used by the internal operating system OS i of the storage controller CTRL and may be a component distinct from the host file system FS_h of the host device 110.

The event handler 126 provides the event signal event_s to the internal operating system OS_i according to the operation of program devices PgmD operating as functional blocks in the storage device 120.

The program devices PgmD include, for example, the FTL 123, the host interface block 128, the memory interface block 129, and the nonvolatile memory device NVM. The program devices PgmD may further include the ECC engine and the AES engine.

As examples of the operation of the program devices PgmD, the FTL 123 may perform a garbage collection operation of data DATA, a read reclaim operation of the data DATA and a wear-leveling operation, the host interface block 128 may perform a submission operation of the data DATA, a program completion operation of the data DATA and a cache hit operation of the data DATA, and the nonvolatile memory device NVM may perform a read operation of the data DATA and a write operation of the data DATA.

In an example embodiment, communication between the components in the storage controller CTRL may be implemented through the system bus BUS or an individual communication method. For example, communication between the host interface block 128 and the FTL 123, communication between the FTL 123 and the memory interface block 129, may be implemented through the system bus BUS or an individual communication method.

Figure 3:
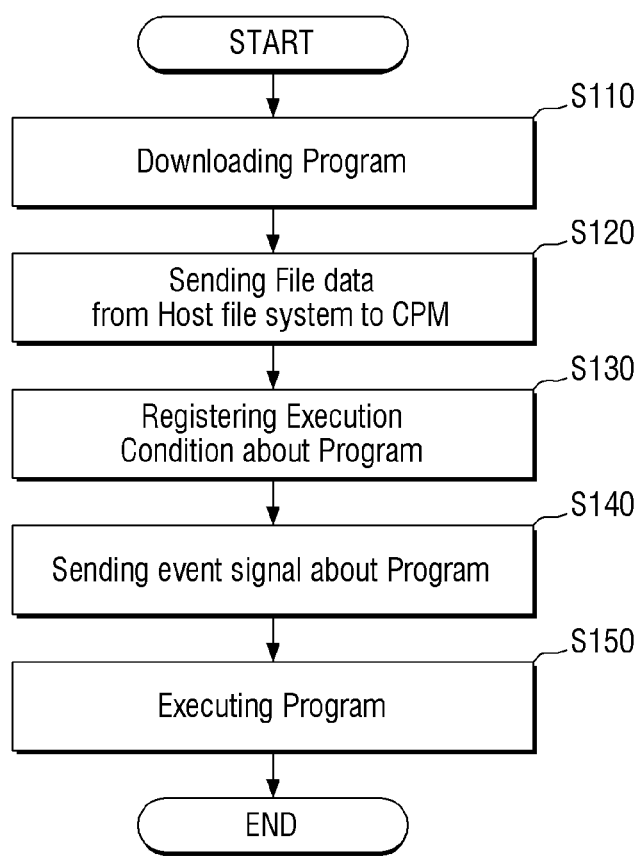
FIGS. 3 and 4 are flowcharts illustrating operation of the storage system of FIG. 2 according to example embodiments.
Figure 4:
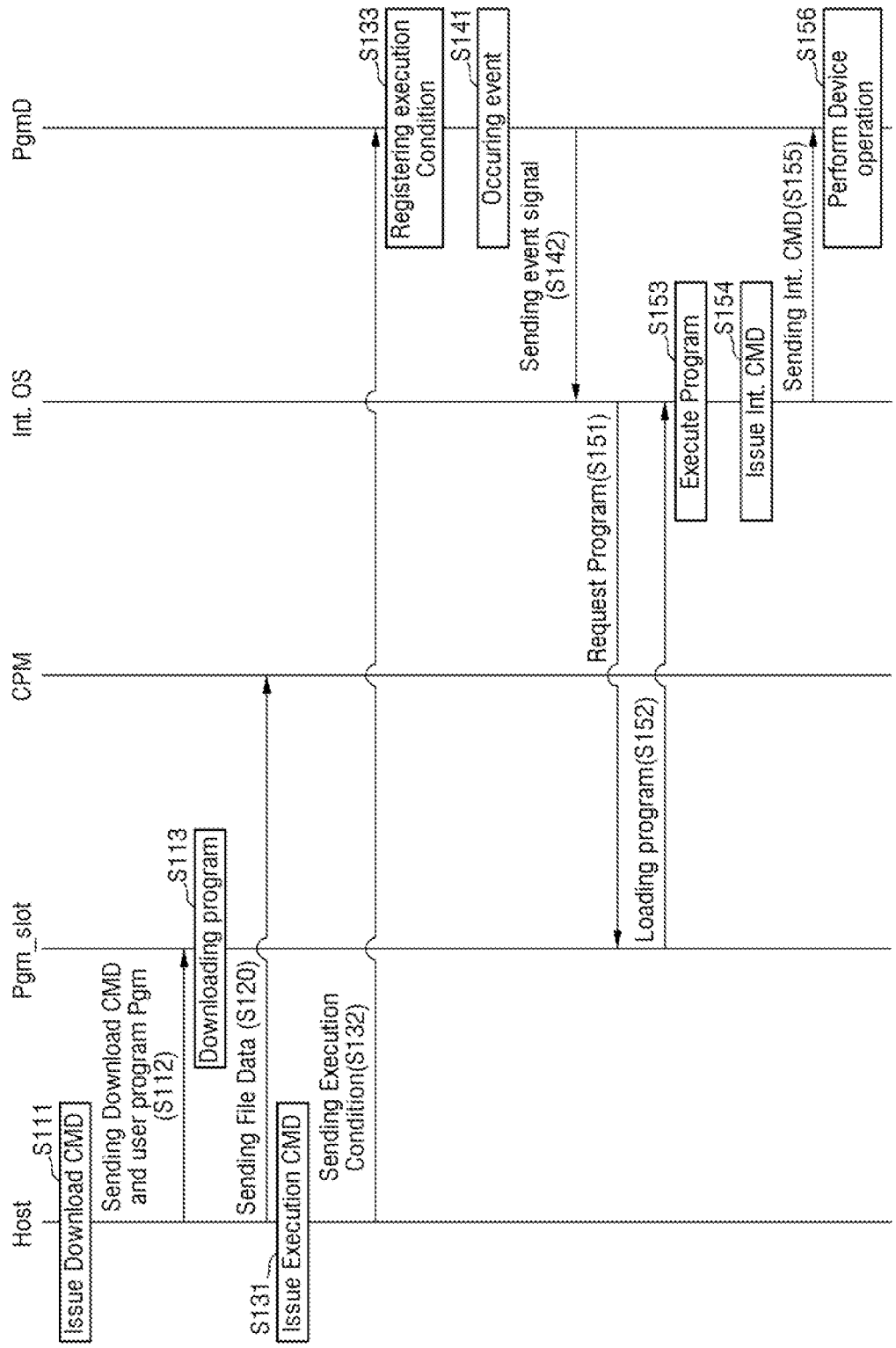

FIGS. 3 and 4 are flowcharts illustrating operation of the storage system 100a of FIG. 2 according to example embodiments. FIGS. 5 through 10 are diagrams for explaining operation of the storage system 100a of FIG. 2 according to example embodiments.

Referring to FIGS. 2 through 4, the storage device 120 downloads a user program Pgm (operation S110). For example, the storage device 120 may download the user program Pgm through the host device 110 after boot-on of the storage device 120.

The host device 110 issues a download command Download CMD through the host operating system OS_h (operation S111). The host device 110 sends the download command Download CMD and a user program Pgm including $a^{th}$ through $Z^{th}$ user programs Pgma through PgmZ (operation S112).

The storage device 120 stores the $a^{th}$ through $Z^{th}$ user programs Pgma through PgmZ in a program slot PS in the internal memory 124 in response to the download command Download CMD (operation S113).

Figure 5:
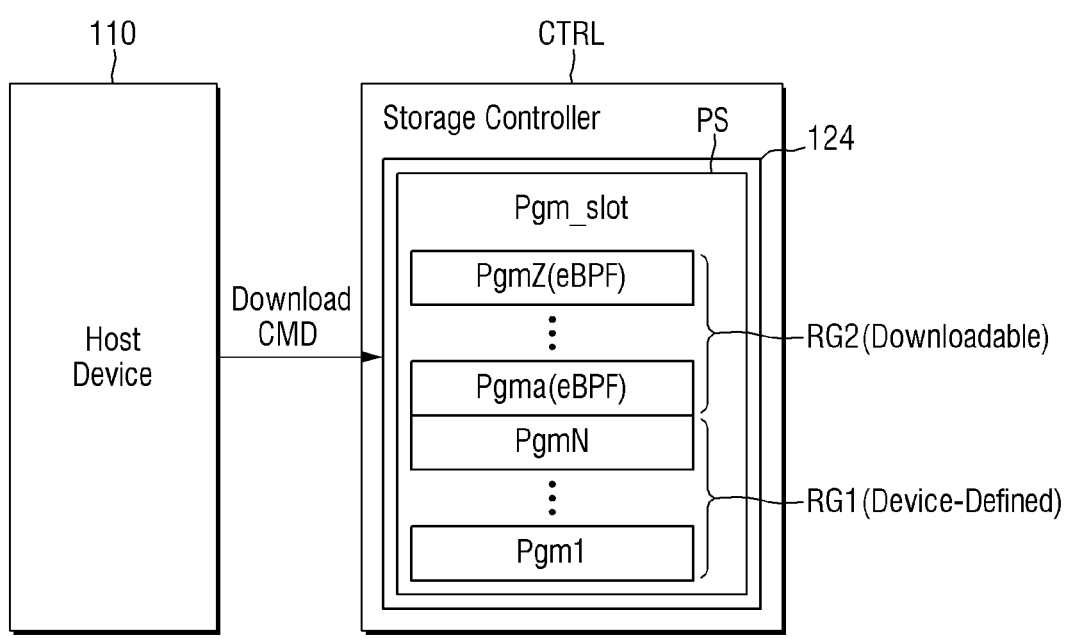

Referring additionally to FIG. 5, the program slot PS includes a first region RG1 and a second region RG2. The program slot PS stores first through $N^{th}$ user programs Pgm1 through PgmN, which are defined in the storage device 120, in the first region RG1 and stores the $a^{th}$ through $Z^{th}$ user programs Pgma through PgmZ, which can be stored through the host device 100, in the second region RG2.

The $a^{th}$ through $Z^{th}$ user programs Pgma through PgmZ may be program codes and may correspond to, for example, extended Berkeley Packet Filter (eBPF) or a script of Python. However, example embodiments are not limited to these examples. For ease of description, the following description will be based on the assumption that the $a^{th}$ through $N^{th}$ user programs Pgma through PgmN are stored in the form of the eBPF.

FIG. 6 is an example program code showing the contents of the $Z^{th}$ user program PgmZ. Referring additionally to FIG. 6, the $Z^{th}$ user program PgmZ may be written in a programming language. In an example embodiment, the $Z^{th}$ user program PgmZ may be compiled in the form of the eBPF in the C language.

The $Z^{th}$ user program PgmZ may include a garbage collection (GC) operation accompanied by logical block address filtering. An operation to be described later in the $Z^{th}$ user program PgmZ is an example of the user program Pgm, and example embodiments are not limited to this example.

The $Z^{th}$ user program PgmZ may include a garbage collection execution (gc_copy) operation and a garbage collection drop (gc_drop) operation.

The $Z^{th}$ user program PgmZ includes an "if" statement including a condition expression for a logical block address. When the logical block address is less than 40,000, the $Z^{th}$ user program PgmZ may return the garbage collection execution (gc_copy) operation through the "if" statement. When the logical block address reaches or exceeds 40,000, the $Z^{th}$ user program PgmZ may return the garbage collection drop (gc_drop) operation. Then, through the execution of the $Z^{th}$ user program PgmZ, the storage device 120 may perform garbage collection only on blocks having a logical block address of less than 40,000. The 40,000 is an example number and example embodiments are not limited to this number.

That is, through the execution of the $Z^{th}$ user program PgmZ, the storage device 120 performs a garbage collection (GC) operation accompanied by logical block address filtering based on garbage collection (gc) which is a general storage function. Therefore, it can been seen that the $a^{th}$ through $Z^{th}$ user programs Pgma through PgmZ may operate based on the general storage function according to program codes. A description of each of the $a^{th}$ through $Z^{th}$ user programs Pgma through PgmZ may correspond to the description of the $Z^{th}$ user program PgmZ.

Figure 7:
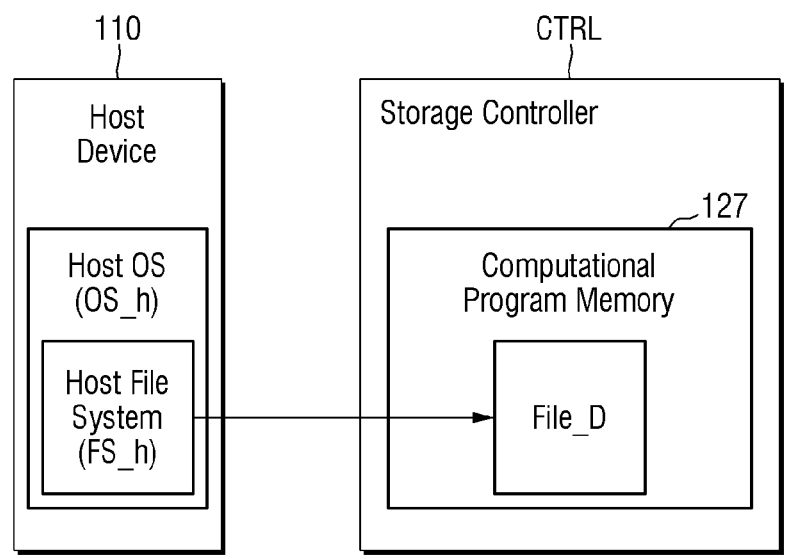

Referring additionally to FIG. 7, the host device 110 sends file data File_D from the host file system FS_h to the computational program memory 127 (operation S120). A user program to be executed later will be executed based on the file data File_D stored in the computational program memory 127.

Figure 8:
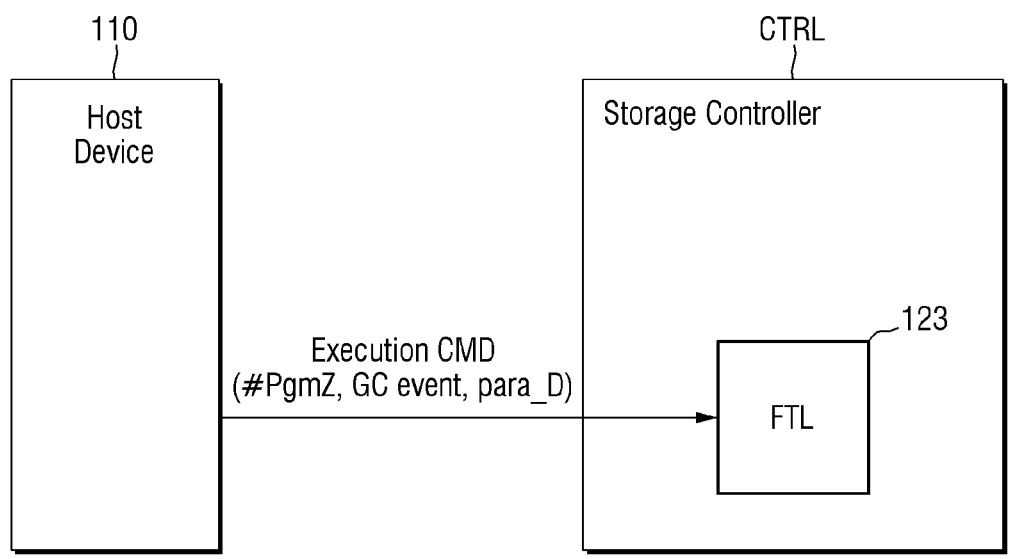

Referring additionally to FIG. 8, the storage device 120 registers an execution condition for the user program Pgm (operation S130).

The host device 110 issues an execution command Execution CMD through the host operating system OS_h (operation S131). The host device 110 sends the execution command Execution CMD to a program device PgmD (operation S132).

For example, in the case of the $Z^{th}$ user program PgmZ of FIG. 6, the execution command Execution CMD includes an execution condition, and the execution condition includes a slot ID #PgmZ, an event occurrence time GC event, and parameter data para_D.

The slot ID #PgmZ indicates data needed by the internal operating system OS_i to load a user program (Pgm1 through PgmN, Pgma through PgmZ) targeted by the execution command Execution CMD.

The event occurrence time GC event is information corresponding to an operation time of a program device PgmD on which the user program (Pgm1 through PgmN, Pgma through PgmZ) targeted by the execution command Execution CMD is based. For example, in the case of the $Z^{th}$ user program PgmZ of FIG. 6, the event occurrence time GC event corresponds to a garbage collection (GC) operation time of the FTL 123.

The parameter data para D is a factor for executing the user program (Pgm1 through PgmN, Pgma through PgmZ), and the user program (Pgm1 through PgmN, Pgma through PgmZ) performs an operation based on the parameter data para_D. For example, in the case of the $Z^{th}$ user program PgmZ of FIG. 6, the parameter data para_D corresponds to a logical block address value of 40,000.

The program device PgmD registers the slot ID #PgmZ, the event occurrence time GC event, and the parameter data para D included in the execution command Execution CMD (operation S133). In the case of the $Z^{th}$ user program PgmZ of FIG. 6, the FTL 123 stores and registers the slot ID #PgmZ, the event occurrence time GC event, and the parameter data para_D which are included in the execution condition.

Figure 9:
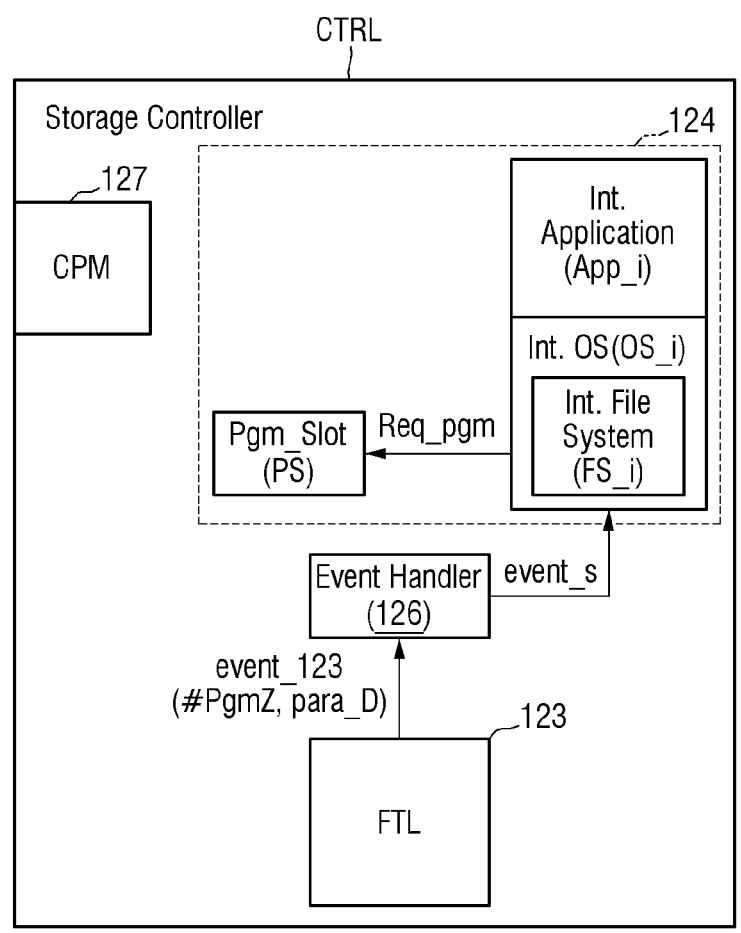

Referring additionally to FIG. 9, the event handler 126 sends an event signal event_s for the user program Pgm to the internal operation system OS_i (operation S140).

The program device PgmD generates an event signal at an event occurrence time (operation S141). In the case of the $Z^{th}$ user program PgmZ of FIG. 6, the event handler 126 receives the slot ID #PgmZ and the parameter data para_D from the FTL 123 at an event occurrence time event 123 which corresponds to the event occurrence time GC event indicated by the parameter data para_D.

The event handler 126 provides the event signal event s to the internal operating system OS_i based on the received slot ID #PgmZ and parameter data para_D (operation S142).

The internal operating system OS_i executes the program based on the event signal event_s (operation S150). The internal operating system OS_i performs a program request Req_pgm on the program slot PS based on the event signal event_s (operation S151).

Figure 10:
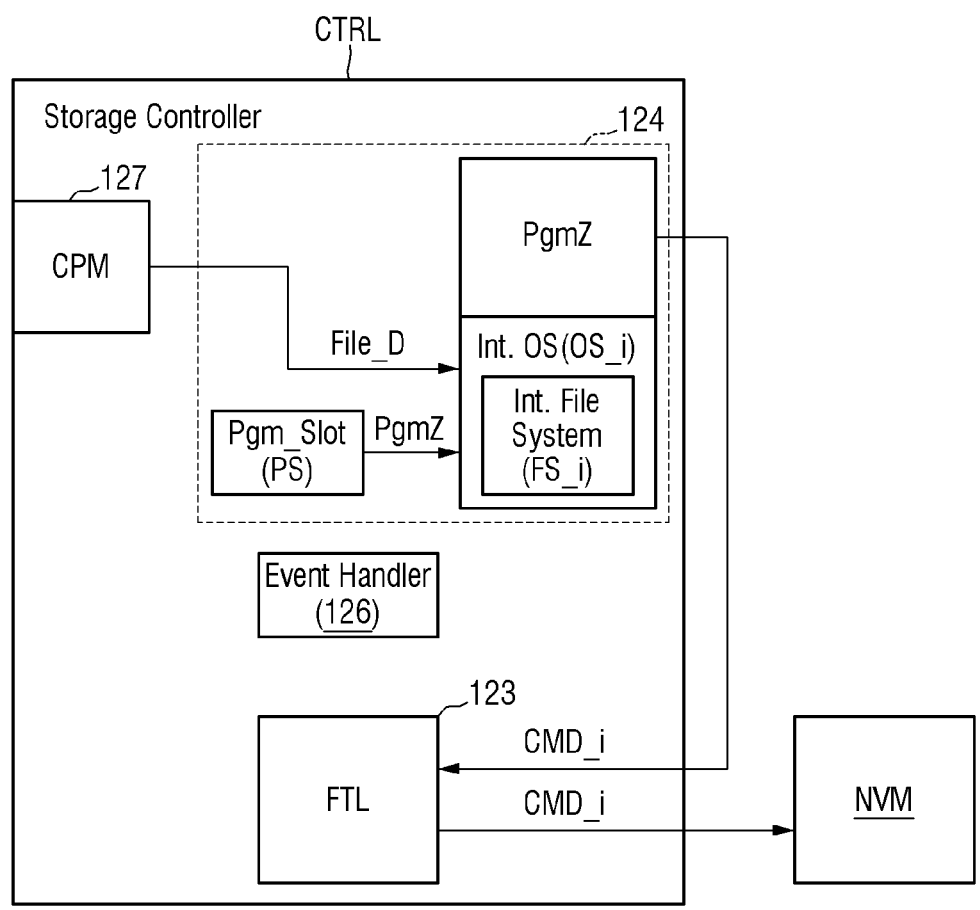

Referring additionally to FIG. 10, the internal operating system OS_i loads the user program Pgm based on the event signal event_s (operation S152) and executes the user program Pgm (operation S153).

In the case of the $Z^{th}$ user program PgmZ of FIG. 6, the internal operating system OS_i loads the $Z^{th}$ user program PgmZ and executes it as the internal application APP_i.

The internal operating system OS_i executes the $Z^{th}$ user program PgmZ based on the file data File_D stored in the computational program memory 127.

The $Z^{th}$ user program PgmZ issues an internal command CMD_i for the program device PgmD (operation S154). The $Z^{th}$ user program PgmZ issues the internal command CMD_i to the program device PgmD (operation S155).

The program device PgmD performs an internal operation in response to the internal command CMD_i (operation S156). In the case of the $Z^{th}$ user program PgmZ of FIG. 6, the program device PgmD performs the garbage collection execution (gc_copy) operation needed to execute the $Z^{th}$ user program PgmZ in response to the internal command CMD_i.

Figure 11:
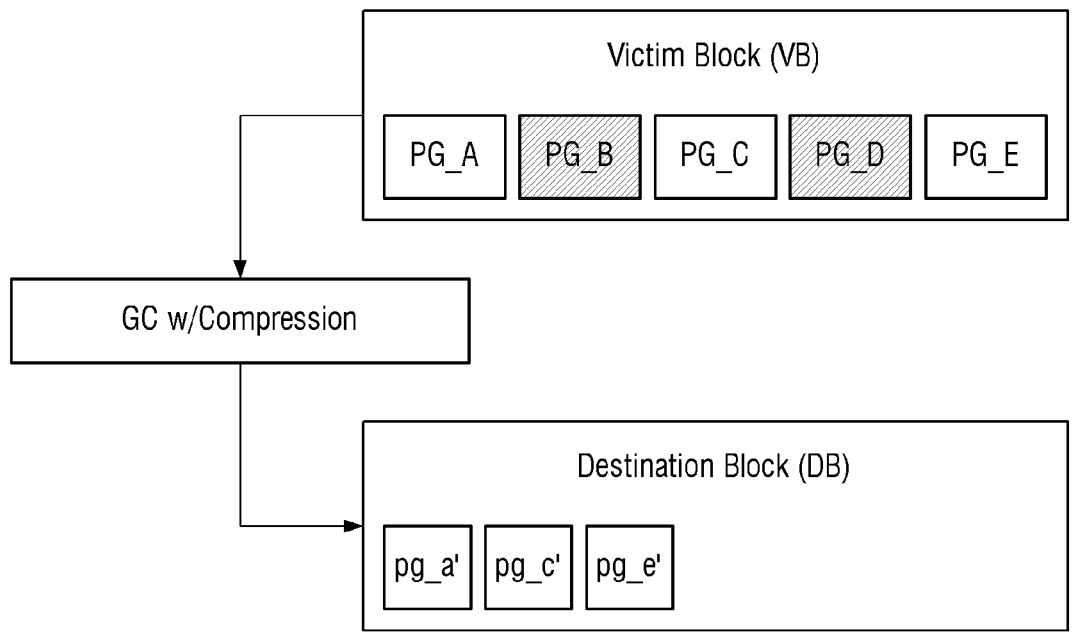
FIG. 11 is a diagram for explaining another operation of the storage system of FIG. 2 according to example embodiments.

FIG. 11 is a diagram for explaining another operation of the storage system 100a of FIG. 2 according to an example embodiment. For ease of description, the following description will focus on differences from the description of FIGS. 6 through 10. For reference, FIG. 11 is a diagram for explaining another user program Pgm stored in the program slot PS of FIG. 5.

The operation shown in FIG. 11 may include a garbage collection (GC) operation accompanied by data compression. The operation of FIG. 11 is an example of the user program Pgm, and example embodiments are not limited to this example.

For example, a target memory block of a garbage collection operation may be referred to as a victim block. The operation of FIG. 11 includes an operation of compressing valid data PG_A, PG_C and PG_E of a victim block VB of the nonvolatile memory device NVM, writing the compressed data pg_a', pg_c' and pg_e' to a destination block DB, and then erasing the victim memory block VB.

As in the operations of FIGS. 6 through 10, the internal operating system OS_i may perform the operation of FIG. 11 based on the garbage collection (GC) operation of the FTL 123 by executing the user program Pgm.

The computational storage device 120 according to some example embodiments may perform various computational operations using a user program Pgm downloaded through the host device 110, and the user program Pgm may apply a program device PgmD which is a functional block inside the computational storage device 120.

Furthermore, the computational storage device 120 may perform an internal operation according to an execution command Execution CMD including an execution condition provide by the host device 100. Therefore, the host device 100 can efficiently manage the internal operation of the computational storage device 120.

Figure 12:
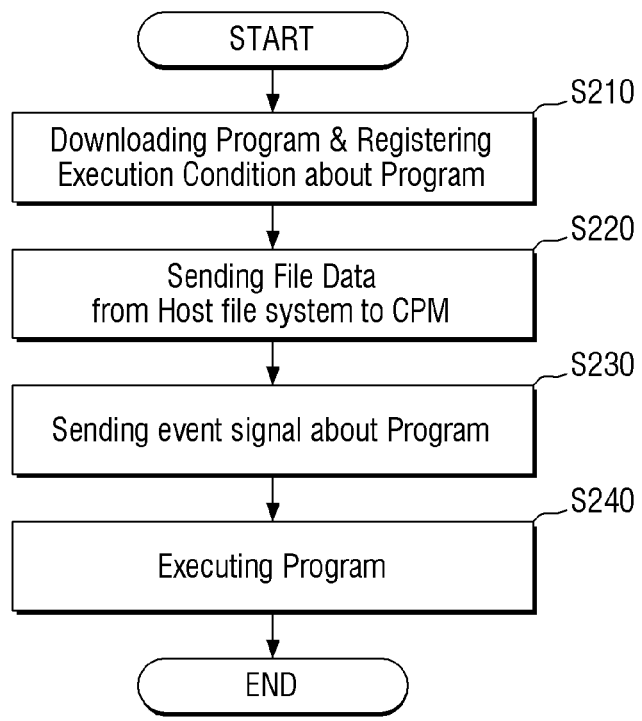
FIG. 12 is a flowchart illustrating operation of some storage systems according to example embodiments.

FIG. 12 is a flowchart illustrating the operation of storage systems according to example embodiments. For ease of description, the following description will focus on differences from the description of FIG. 3. For ease of description, the description already provided in FIG. 3 will not be repeated.

In contrast to the operations of FIG. 3, downloading a user program, which corresponds to operation S110, and registering an execution condition for the user program, which corresponds to operation S130, are successively performed (operation S210).

After the registering of the execution condition for the user program, sending file data File_D from a host file system FS_h to a computational program memory 127 (operation S220), which corresponds to operation S120, is performed.

Next, sending an event signal (operation S230), which corresponds to operation S140, and executing the user program (operation S240), which corresponds to operation S150, are performed.

Figure 13:
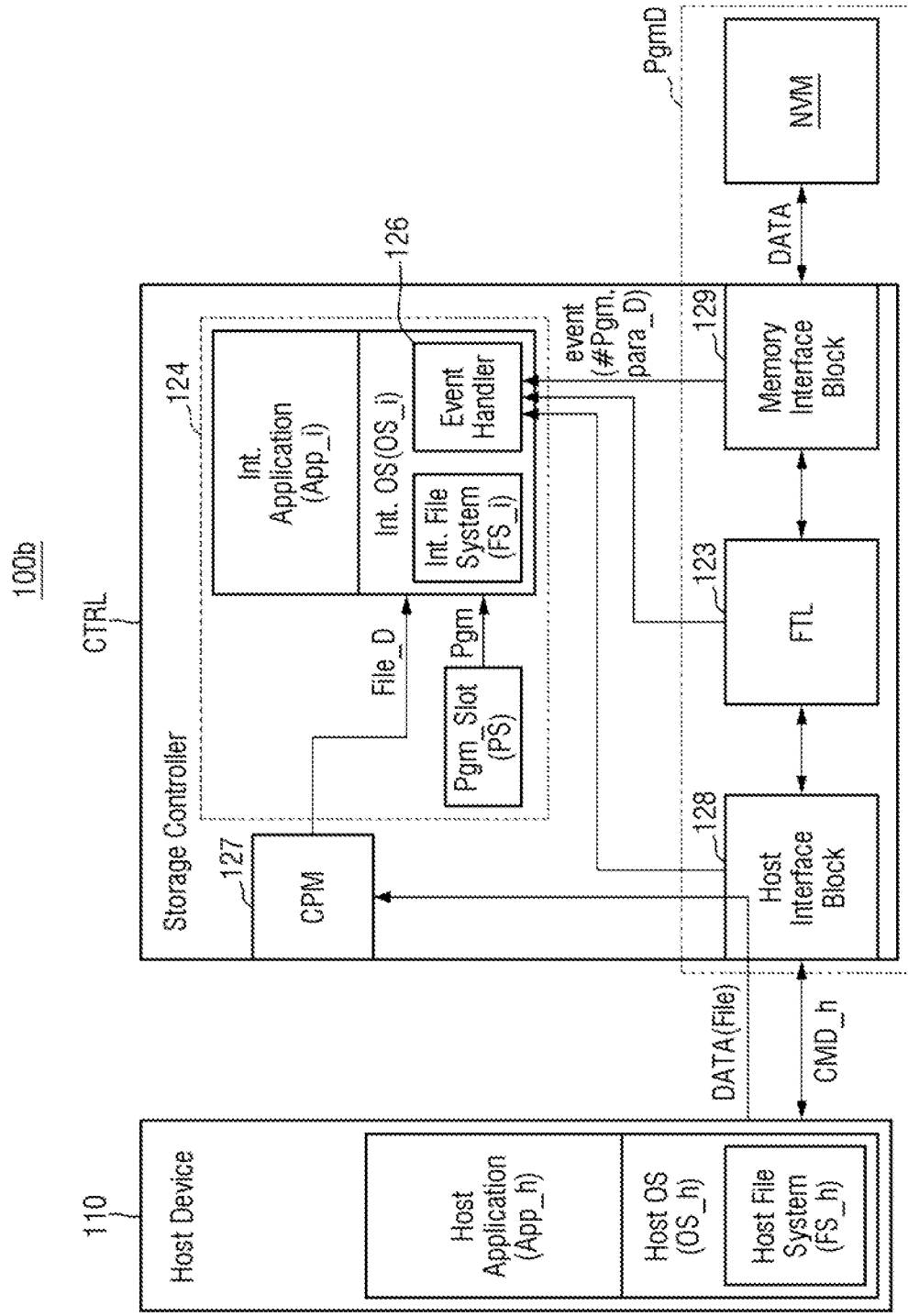
FIG. 13 is a block diagram for explaining some storage systems according to example embodiments.

FIG. 13 is a block diagram for explaining some storage systems according to example embodiments. For ease of description, the following description will focus on differences from the description of FIG. 2. For ease of description, the description already provided in FIG. 2 will not be repeated.

An event handler 126 may be implemented in an internal operating system OS_i in the form of software, firmware, or a combination of the same. As shown, storage system 100b the event handler 126 is implemented in the internal operating system OS_i.

Therefore, the internal operating system OS_i receives a slot ID #Pgm and parameter data para_D from a program device PgmD at an event occurrence time event.

In the internal operating system OS_i, the event handler 126 loads a user program Pgm corresponding to the slot ID #Pgm.

Figure 14:
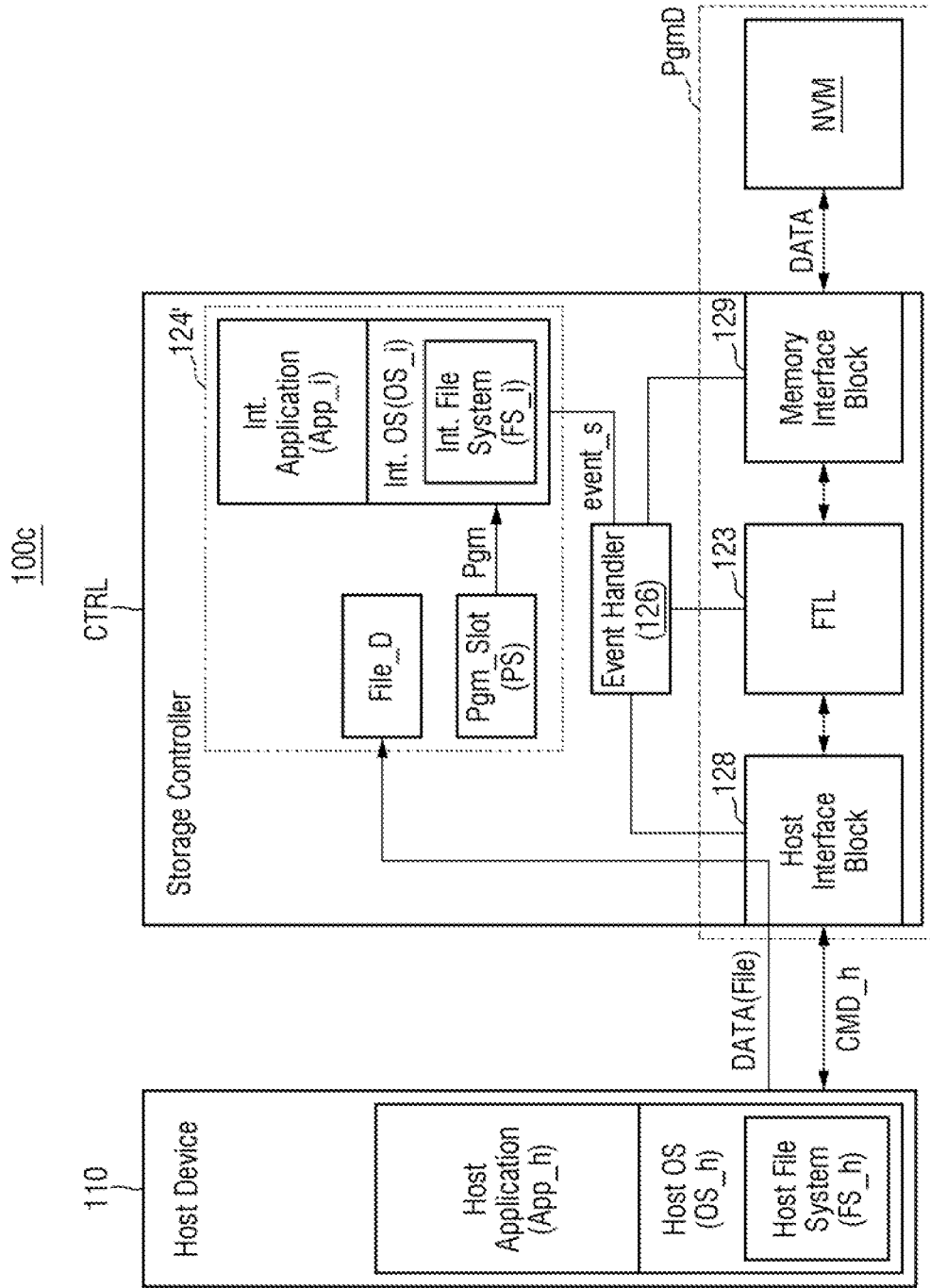
FIG. 14 is a block diagram for explaining some storage systems according to example embodiments.

FIG. 14 is a block diagram for explaining some storage systems according to example embodiments. For ease of description, the following description will focus on differences from the description of FIG. 2. For ease of description, the description already provided in FIG. 2 will not be repeated.

In contrast to in FIG. 2 in which a separate computational program memory 127 is disposed, in storage system 100c file data File_D is provided from a host file system FS_h to an internal memory 124' and stored in the internal memory 124', and an internal operating system OS_i executes a user program Pgm based on the file data File_D stored in the internal memory 124'.

Figure 15:
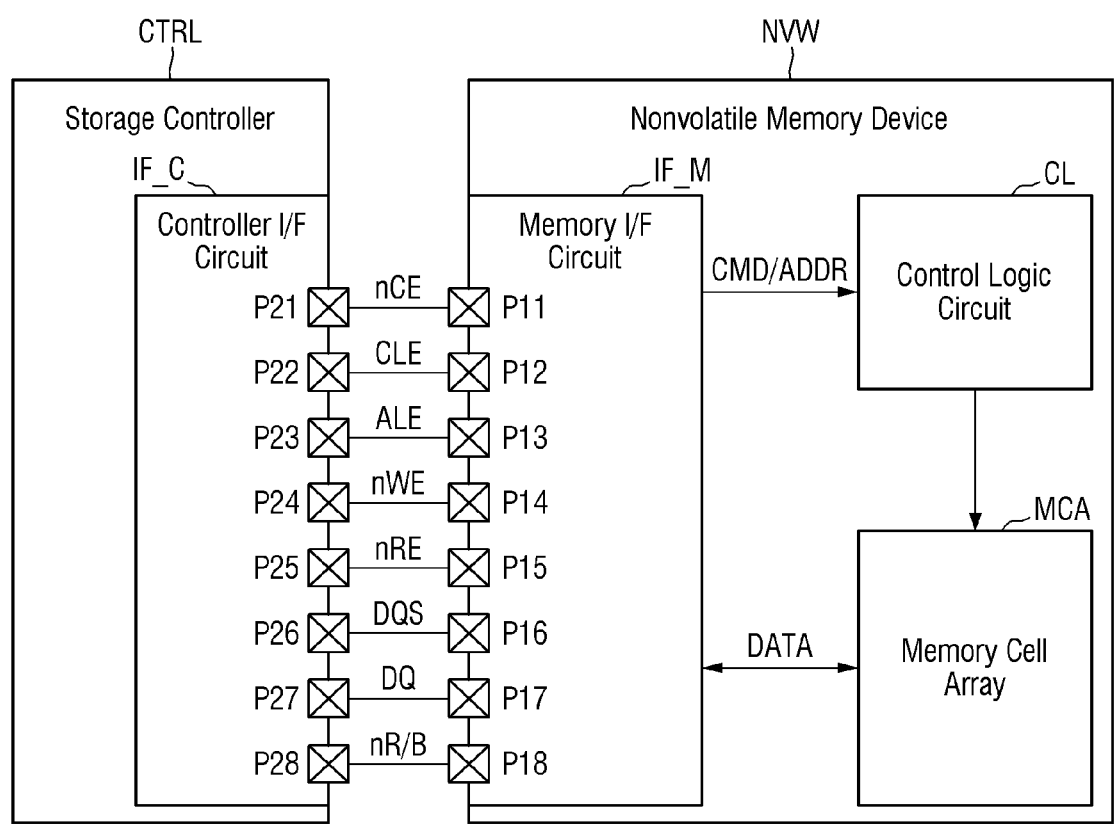
FIG. 15 is a diagram for explaining communication between a storage controller and a nonvolatile memory device according to example embodiments.

FIG. 15 is a diagram for explaining communication between a storage controller CTRL and a nonvolatile memory device NVM according to example embodiments. Referring to FIG. 15, a storage device may include the storage controller CTRL and the nonvolatile memory device NVM. One communication channel between the storage controller CTRL and the nonvolatile memory device NVM is described with reference to FIG. 15, but example embodiments are not limited thereto. The storage controller CTRL and other nonvolatile memory devices may communicate with each other through one channel or multiple channels channels (i.e., a plurality of channels) similar to the channel described with reference to FIG. 15.

The storage controller CTRL may include a first interface circuit IF_C. In an example embodiment, the first interface circuit IF_C may be a circuit included in a memory interface block, such as the memory interface block 129 described above.

The first interface circuit IF_C may include first through eighth signal pins P21 through P28. The storage controller CTRL may transmit various signals to the nonvolatile memory device NVM through the signal pins P11 through P18 of the first interface circuit IF_C. For example, the storage controller CTRL may transmit a chip enable signal nCE to the nonvolatile memory device NVM through the first pin P21, transmit a command latch enable signal CLE to the nonvolatile memory device NVM through the second pin P22, transmit an address latch enable signal ALE to the nonvolatile memory device NVM through the third pin P23, transmit a write enable signal nWE to the nonvolatile memory device NVM through the fourth pin P24, transmit a read enable signal nRE to the nonvolatile memory device NVM through the fifth pin P25, exchange a data strobe signal DQS with the nonvolatile memory device NVM through the sixth pin P26, exchange a data signal DQ with the nonvolatile memory device NVM through the seventh pin P27, and receive a ready signal (or a busy signal) nR/B from the nonvolatile memory device NVM through the eighth pin P28. In an example embodiment, the seventh pin P17 may include a plurality of pins according to an implementation method.

The nonvolatile memory device NVM may include a second interface circuit IF_M, a control logic circuit CL, and a memory cell array MCA. The second interface circuit IF_M may include first through eighth signal pins P11 through P18. The second interface circuit IF_M may receive various signals from the storage controller CTRL through the first through eighth pins P21 through P28. For example, the nonvolatile memory device NVM may receive the chip enable signal nCE from the storage controller CTRL through the first pin P11, receive the command latch enable signal CLE from the storage controller CTRL through the second pin P12, receive the address latch enable signal ALE from the storage controller CTRL through the third pin P13, receive the write enable signal nWE from the storage controller CTRL through the fourth pin P14, receive the read enable signal nRE from the storage controller CTRL through the fifth pin P15, exchange the data strobe signal DQS with the storage controller CTRL through the sixth pin P16, exchange the data signal DQ with the storage controller CTRL through the seventh pin P17, and transmit the ready signal (or the busy signal) nR/B to the storage controller CTRL through the eighth pin P18.

The second interface circuit IF M may obtain a command CMD from the data signal DQ received in an enable period (e.g., a high level state) of the command latch enable signal CLE based on toggle timings of the write enable signal nWE. The second interface circuit IF_M may obtain an address ADDR from the data signal DQ received in an enable period (e.g., a high level state) of the address latch enable signal ALE based on the toggle timings of the write enable signal nWE.

In an example embodiment, the write enable signal nWE may maintain a static state (e.g., a high level or a low level) and may toggle between a high level and a low level. For example, the write enable signal nWE may toggle in a period in which the command CMD or the address ADDR is transmitted. Accordingly, the second interface circuit IF_M may obtain the command CMD or the address ADDR based on the toggle timings of the write enable signal nWE.

In a data output operation of the nonvolatile memory device NVM, the second interface circuit IF_M may receive the toggling read enable signal nRE through the fifth pin P15 before outputting data DATA. The second interface circuit IF_M may generate the toggling data strobe signal DQS based on the toggling of the read enable signal nRE. For example, the second interface circuit IF_M may generate the data strobe signal DQS that starts to toggle after a predetermined delay (e.g., tDQSRE) from a toggling start time of the read enable signal nRE. The second interface circuit IF_M may transmit the data signal DQ including the data DATA in synchronization with the toggle timing of the data strobe signal DQS. Accordingly, the data DATA may be aligned with the toggle timing of the data strobe signal DQS and transmitted to the storage controller CTRL.

In a data input operation of the nonvolatile memory device NVM, the second interface circuit IF_M may receive the toggling data strobe signal DQS from the storage controller CTRL together with the data signal DQ including the data DATA. The second interface circuit IF_M may obtain the data DATA from the data signal DQ based on the toggle timing of the data strobe signal DQS. For example, the second interface circuit IF_M may obtain the data DATA by sampling the data signal DQ at a rising edge and a falling edge of the data strobe signal DQS.

The second interface circuit IF_M may transmit the ready/busy output signal nR/B to the storage controller CTRL through the eighth pin P18. When the nonvolatile memory device NVM is in a busy state (that is, when internal operations are being performed), the second interface circuit IF_M may transmit the ready/busy output signal nR/B indicating the busy state to the storage controller CTRL. When the nonvolatile memory device NVM is in a ready state (that is, when the internal operations are not performed or are completed), the second interface circuit IF_M may transmit the ready/busy output signal nR/B indicating the ready state to the storage controller CTRL.

The control logic circuit CL may generally control various operations of the nonvolatile memory device NVM. The control logic circuit CL may receive the obtained command/address CMD/ADDR from the second interface circuit IF_M. The control logic circuit CL may generate control signals for controlling other components of the nonvolatile memory device NVM according to the received command/address CMD/ADDR.

The memory cell array MCA may store the data DATA obtained from the second interface circuit IF_M under the control of the control logic circuit CL. The memory cell array MCA may output the stored data DATA to the second interface circuit IF_M under the control of the control logic circuit CL.

The memory cell array MCA may include a plurality of memory cells. For example, the memory cells may be flash memory cells. However, example embodiments are not limited thereto, and the memory cells may also be RRAM cells, FRAM cells, PRAM cells, thyristor random access memory (TRAM) cells, or MRAM cells.

Figure 16:
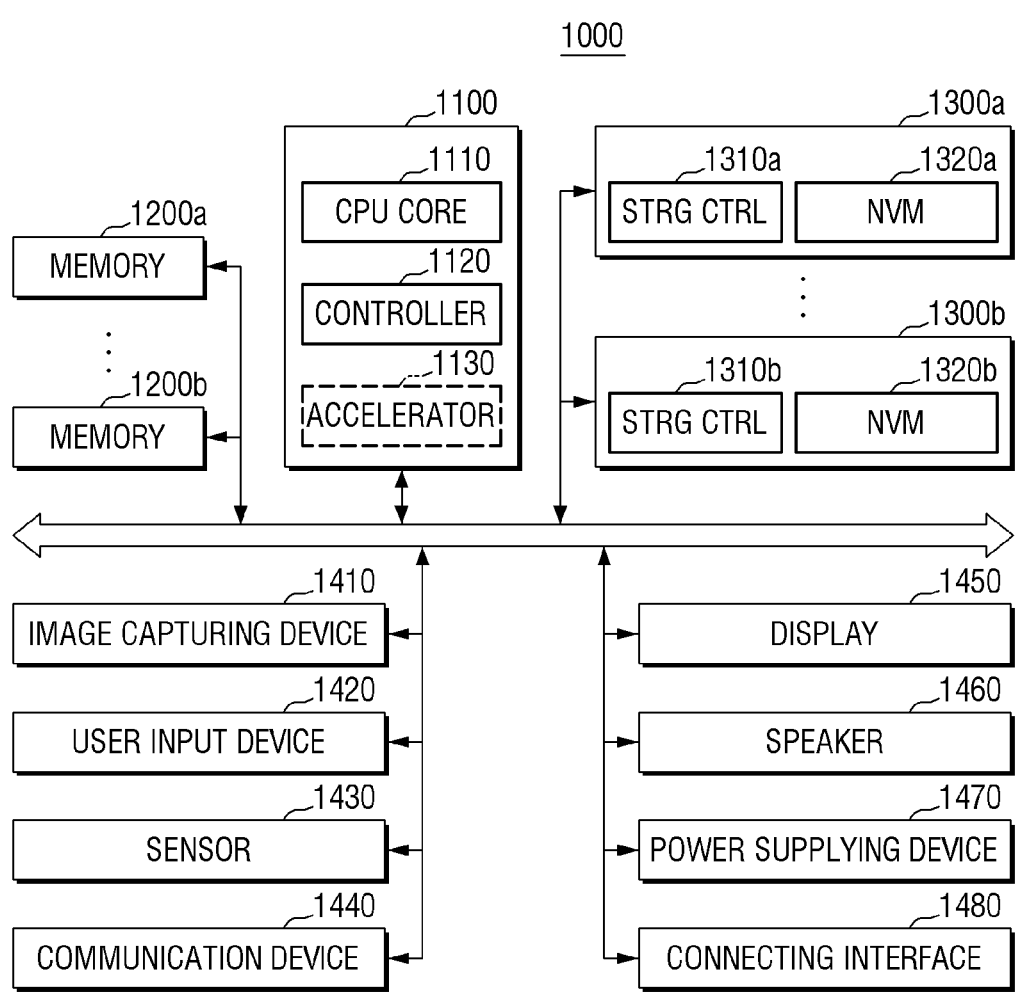
FIG. 16 illustrates a system according to example embodiments.

FIG. 16 illustrates a system 1000 according to example embodiments. Referring to FIG. 16, the system 1000 may be a mobile system such as a portable communication terminal (mobile phone), a smartphone, a tablet personal computer, a wearable device, a healthcare device, or an IOT device. The system 1000 is not necessarily limited to the mobile system and may also be a personal computer, a laptop computer, a server, a media player, or an automotive device such as a navigation device.

The system 1000 may include a main processor 1100, memories 1200a through 1200b and storage devices 1300a through 1300b and may additionally include one or more of an image capturing device 1410, a user input device 1420, a sensor 1430, a communication device 1440, a display 1450, a speaker 1460, a power supplying device 1470 and a connecting interface 1480.

The main processor 1100 may control the overall operation of the system 1000, more specifically, may control the operation of other components constituting the system 1000. The main processor 1100 may be implemented as a general-purpose processor, a dedicated processor, or an application processor.

The main processor 1100 may include one or more CPU cores 1110 and may further include a controller 1120 for controlling the memories 1200a through 1200b and/or the storage devices 1300a through 1300b. According to an example embodiment, the main processor 1100 may further include an accelerator 1130 which is a dedicated circuit for high-speed data operation such as artificial intelligence (AI) data operation. The accelerator 1130 may include a graphics processing unit (GPU), a neural processing unit (NPU) and/or a data processing unit (DPU) and may be implemented as a separate chip physically independent of other components of the main processor 1100.

The memories 1200a through 1200b may be used as main memory devices of the system 1000 and may include volatile memories such as static random access memories (SRAMs) and/or dynamic random access memories (DRAMs), but may also include nonvolatile memories such as flash memories, PRAMs and/or RRAMs. The memories 1200a through 1200b may also be implemented in the same package with the main processor 1100. In an example embodiment, the memories 1200a through 1200b may operate as host memories described above.

The storage devices 1300a through 1300b may function as nonvolatile storage devices that store data regardless of whether power is supplied and may have a relatively larger storage capacity than the memories 1200a through 1200b. The storage devices 1300a through 1300b may respectively include storage controllers 1310a through 1310b and nonvolatile memories 1320a through 1320b which store data under the control of the storage controllers 1310a through 1310b. The nonvolatile memories 1320a through 1320b may include flash memories having a 2D structure or a 3D vertical NAND (VNAND) structure but may also include other types of nonvolatile memories such as PRAMs and/or RRAMs.

The storage devices 1300a through 1300b included in the system 1000 may be physically separated from the main processor 1100 or may be implemented in the same package with the main processor 1100. In addition, the storage devices 1300a through 1300b may be in the form of SSDs or memory cards and thus may be detachably coupled to other components of the system 1000 through an interface such as the connecting interface 1480 which will be described later. The storage devices 1300a through 1300b may be, but are not necessarily limited to, devices to which a standard protocol such as UFS, eMMC, or NVMe is applied.

In an example embodiment, the storage devices 1300a through 1300b may be configured to perform various operations under the control of the main processor 1100 and may be the computational storage devices described with reference to FIGS. 1 through 15. In an example embodiment, the storage devices 1300a through 1300b may be configured to execute or perform some of the functions executed by the accelerator 1130.

The image capturing device 1410 may capture still images or moving images and may be a camera, a camcorder, and/or a webcam.

The user input device 1420 may receive various types of data from a user of the system 1000 and may be a touch pad, a keypad, a keyboard, a mouse and/or a microphone.

The sensor 1430 may detect various types of physical characteristics that can be obtained from outside the system 1000 and may convert the detected physical characteristics into electrical signals. The sensor 1430 may be a temperature sensor, a pressure sensor, an illuminance sensor, a position sensor, an acceleration sensor, a biosensor, and/or a gyroscope sensor.

The communication device 1440 may transmit and receive signals to and from other devices outside the system 1000 according to various communication protocols. The communication device 1440 may include an antenna, a transceiver, and/or a modem.

The display 1450 and the speaker 1460 may function as output devices that respectively output visual information and audio information to the user of the system 1000.

The power supplying device 1470 may appropriately convert power supplied from a battery embedded in the system 1000 and/or an external power source and supply the power to each component of the system 1000.

The connecting interface 1480 may provide a connection between the system 1000 and an external device which is connected to the system 1000 to exchange data with the system 1000. The connecting interface 1480 may be implemented as various interfaces such as ATA, SATA, e-SATA, SCSI, SAS, PCI, PCIe, NVMe, IEEE 1394, USB, SD card, MMC, eMMC, UFS, eUFS, and CF card interfaces.

Figure 17:
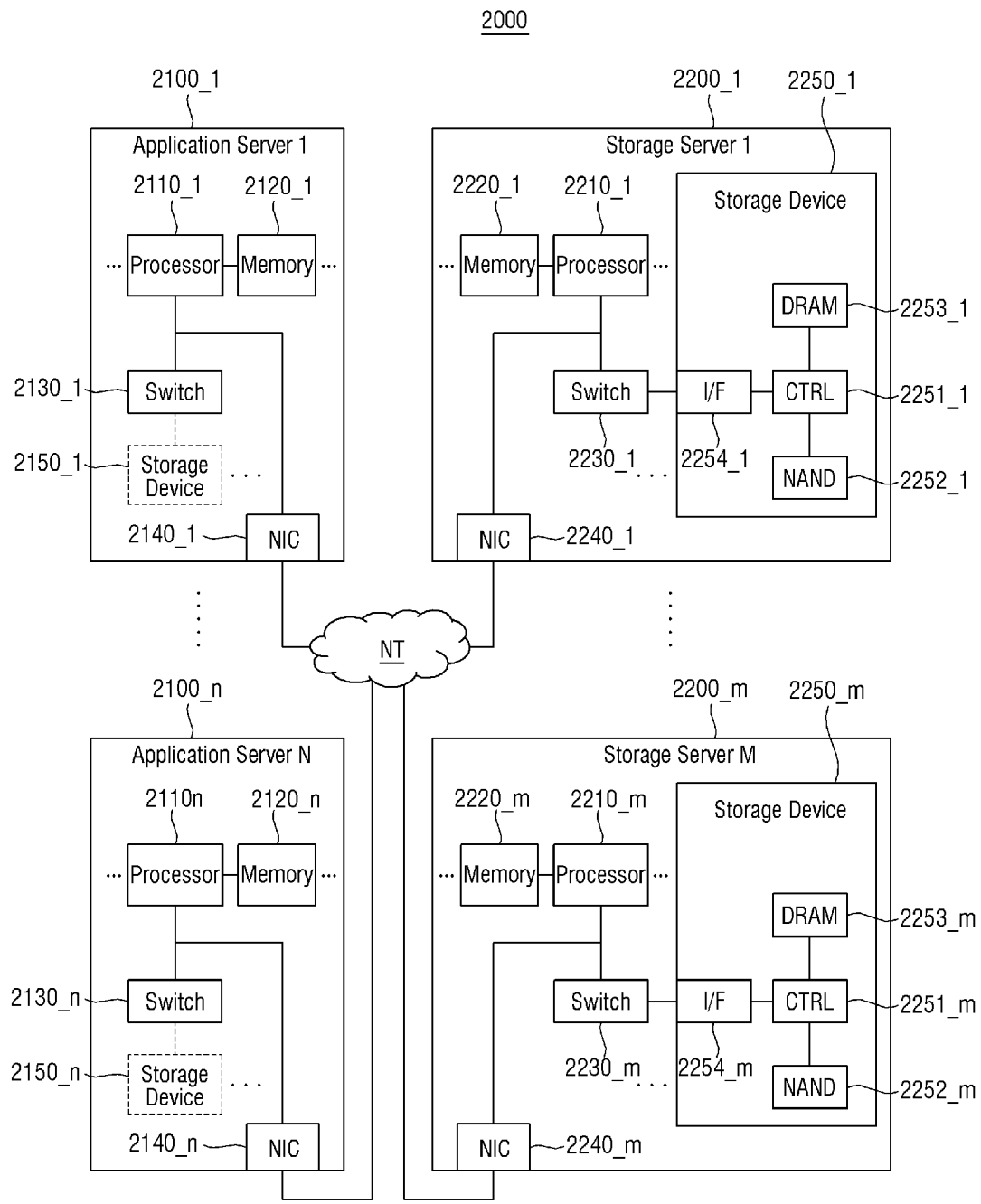
FIG. 17 is a block diagram of a data center according to an example embodiment.

FIG. 17 is a block diagram of a data center 2000 according to an example embodiment. The data center 2000 is a facility that manages various data and provides various services regarding the various data. Thus, the data center 2000 may also be referred to as a data storage center. The data center 2000 may be a system for operating a search engine or a database and may be a computing system used by various institutions. The data center 2000 may include a plurality of application servers 2100_1 through 2100_n and a plurality of storage servers 2200_1 through 2200_m. The number of the application servers 2100_1 through 2100_n and the number of the storage servers 2200_1 through 2200_m may be variously changed.

For ease of description, a first storage server 2200_1 will be described as an example. Each of the other storage servers 2200_2 through 2200_m and the application servers 2100_1 through 2100_n may have a structure similar to that of the first storage server 2200_1.

The first storage server 2200_1 may include a processor 2210_1, a memory 2220_1, a switch 2230_1, a network interface connect (NIC) 2240_1, and a storage device 2250_1. The processor 2210_1 may control the overall operation of the first storage server 2200_1. The memory 2220_1 may store various commands or data under the control of the processor 2210_1. The processor 2210_1 may be configured to access the memory 2220_1 and execute various commands and/or process data. In an example embodiment, the memory 2220_1 may include at least one of various types of memory devices such as a double data rate synchronous DRAM (DDR SDRAM), a high bandwidth memory (HBM), a hybrid memory cube (HMC), a dual in-line memory module (DIMM), an Optane DIMM, and a nonvolatile DIMM (NVDIMM).

In an example embodiment, the number of the processors 2210_1 and the number of the memories 2220_1 included in the first storage server 2200_1 may be variously changed. In an example embodiment, the processor 2210_1 and the memory 2220_1 included in the first storage server 2200_1 may form a processor-memory pair, and the number of processor-memory pairs included in the first storage server 2200_1 may be variously changed. In an example embodiment, the number of the processors 2210_1 and the number of the memories 2220_1 included in the first storage server 2200_1 may be different from each other. The processor 2210_1 may include a single-core processor or a multi-core processor.

The switch 2230_1 may selectively connect the processor 2210_1 and the storage device 2250_1 or selectively connect the NIC 2240_1 and the storage device 2250_1 under the control of the processor 2210_1.

The NIC 2240_1 may be configured to connect the first storage server 2200_1 to a network NT. The NIC 2240_1 may include a network interface card, a network adapter, etc. The NIC 2240_1 may be connected to the network NT by a wired interface, a wireless interface, a Bluetooth interface, an optical interface, or the like. The NIC 2240_1 may include an internal memory, a digital signal processor (DSP), a host bus interface, etc. and may be connected to the processor 2210_1 or the switch 2230_1 through the host bus interface. The host bus interface may include at least one of various interfaces such as ATA, SATA, e-SATA, SCSI, SAS, PCI, PCIe, NVMe, IEEE 1394, USB, SD card, MMC, eMMC, UFS, eUFS, and CF card interfaces. In an example embodiment, the NIC 2240_1 may be integrated with at least one of the processor 2210_1, the switch 2230_1, and the storage device 2250_1.

The storage device 2250_1 may store data or output stored data under the control of the processor 2210_1. The storage device 2250_1 may include a controller 2251_1, a nonvolatile memory 2252_1, a DRAM 2253_1, and an interface 2254_1. In an example embodiment, the storage device 2250_1 may further include a secure element (SE) for security or privacy.

The controller 2251_1 may control the overall operation of the storage device 2250_1. In an example embodiment, the controller 2251_1 may include an SRAM. The controller 2251_1 may store data in the nonvolatile memory 2252_1 or output data stored in the nonvolatile memory 2252_1 in response to signals received through the interface 2254_1. In an example embodiment, the controller 2251_1 may be configured to control the nonvolatile memory 2252_1 based on a toggle interface or an ONFI interface.

The DRAM 2253_1 may be configured to temporarily store data to be stored in the nonvolatile memory 2252_1 or data read from the nonvolatile memory 2252_1. The DRAM 2253_1 may be configured to store various data (e.g., metadata and mapping data) needed for the operation of the controller 2251_1. The interface 2254_1 may provide a physical connection between the processor 2210_1, the switch 2230_1, or the NIC 2240_1 and the controller 2251_1. In an example embodiment, the interface 2254_1 may be implemented as a direct attached storage (DAS) interface that connects the storage device 2250_1 directly to a dedicated cable. In an example embodiment, the interface 2254_1 may be configured based on at least one of the various interfaces described above through the host bus interface.

The components of the first storage server 2200_1 described above are only an example, and example embodiments are not limited thereto. The components of the first storage server 2200_1 described above may be applied to each of the other storage servers or the application servers. In an example embodiment, a storage device 2150_1 may be selectively omitted from each of the application servers 2100_1 through 2100_n.

The application servers 2100_1 through 2100_n and the storage servers 2200_1 through 2200_m may communicate with each other through the network NT. The network NT may be implemented using Fibre Channel (FC) or Ethernet. Here, the FC may be a medium used for relatively high-speed data transmission and may use an optical switch that provides high performance/high availability. The storage servers 2200_1 through 2200_m may be provided as file storage, block storage, or object storage according to an access method of the network NT.

In an example embodiment, the network NT may be a storage dedicated network such as a storage area network (SAN). For example, the SAN may be an FC-SAN using an FC network and implemented according to an FC protocol (FCP). Alternatively, the SAN may be an IP-SAN using a TCP/IP network and implemented according to an SCSI over TCP/IP or Internet SCSI (iSCSI) protocol. In an example embodiment, the network NT may be a general network such as a TCP/IP network. For example, the network NT may be implemented according to a protocol such as FC over Ethernet (FCoE), network attached storage (NAS), or NVMe over Fabrics (NVMe-oF).

In an example embodiment, at least one of the application servers 2100_1 through 2100_n may be configured to access at least another one of the application servers 2100_1 through 2100_n or at least one of the storage servers 2200_1 through 2200_m through the network NT.

For example, the first application server 2100_1 may store data requested by a user or a client in at least one of the storage servers 2200_1 through 2200_m through the network NT. Alternatively, the first application server 2100_1 may obtain data requested by a user or a client from at least one of the storage servers 2200_1 through 2200_m through the network NT. In this case, the first application server 2100_1 may be implemented as a web server or a database management system (DBMS).

That is, a processor 2110_1 of the first application server 2100_1 may access a memory 2120_n or a storage device 2150_n included in another application server (e.g., 2100_n) through the network NT. Alternatively, the processor 2110_1 of the first application server 2100_1 may access the memory 2220_1 or the storage device 2250_1 of the first storage server 2200_1 through the network NT. Accordingly, the first application server 2100_1 can perform various operations on data stored in the other application servers 2100_2 through 2100_n or the storage servers 2200_1 through 2200_m. For example, the first application server 2100_1 may execute or issue a command for transferring or copying data between the other application servers 2100_2 through 2100_n or the storage servers 2200_1 through 2200_m. In this case, the data that is transferred or copied may be transferred from the storage devices 2250_1 through 2250_m of the storage servers 2200_1 through 2200_m to the memories 2120_1 through 2120_n of the application servers 2100_1 through 2100_n via the memories 2220_1 through 2220_m of the storage servers 2200_1 through 2200_m or directly. The data transferred through the network NT may be data encrypted for security or privacy.

In an example embodiment, the storage devices 2150_1 through 2150_n and 2250_1 through 2250_m may be the computational storage devices described with reference to FIGS. 1 through 15 and may be configured to perform various computational operations. The storage devices 2150_1 through 2150_n and 2250_1 through 2250_m may process internal I/O generated while performing various internal operations through their respective interfaces as described with reference to FIGS. 1 through 15.

At least one of the components, elements, modules or units (collectively "components" in this paragraph) represented by a block in the drawings may be embodied as various numbers of hardware, software and/or firmware structures that execute respective functions described above, according to an example embodiment. These components may include, for example, the host controller 111, the host memory 112, the CPU 121, the hardware accelerator 122, the FTL 123, the internal memory 124, the packet manager 125, the event handler 126, the computational program memory 127, the host interface block 128, the memory interface block 129, the storage controller CTRL, shown in FIGS. 1, 2, 5, 7-10, 13 and 14, not being limited thereto. At least one of these components may use a direct circuit structure, such as a memory, a processor, a logic circuit, a look-up table, etc., that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components.

While aspects of example embodiments have been particularly shown and described, it will be understood that various changes in form and details may be made therein without departing from the spirit and scope of the following claims.

What is claimed is:

1. A computational storage device comprising:
a nonvolatile memory configured to store data; and
a storage controller configured to perform a storage function and to control a plurality of applications to be executed based on the data,
wherein the storage function comprises writing data, reading data, and managing storage space of the nonvolatile memory,
wherein the storage controller comprises:
a processor; and
a memory comprising a program slot configured to store a user program,
wherein the processor is configured to drive an operating system to execute the user program to control an application among the plurality of applications to perform a first operation for a plurality of logical block addresses based on an event signal, wherein the plurality of logical block addresses comprises logical block addresses that are less than a logical block address corresponding to a logical block address parameter, and
wherein the application is different from programs that perform the storage function of the storage controller.

2. The computational storage device of claim 1, wherein the user program is stored in the program slot based on an external command.

3. The computational storage device of claim 2, wherein the user program is stored in the program slot as an extended Berkeley Packet Filter (eBPF).

4. The computational storage device of claim 1, wherein the processor is further configured to drive the operating system to control the application to issue an internal command for the first operation.

5. The computational storage device of claim 1, wherein the processor is further configured to control an event handler to identify the application according to an execution condition corresponding to the first operation, the execution condition comprising the logical block address parameter.

6. The computational storage device of claim 5, wherein the event handler is executed by the processor through the operating system.

7. The computational storage device of claim 1, wherein the first operation comprises a garbage collection operation, and
wherein the processor is further configured to identify the logical block addresses that are less than the logical block address corresponding to the logical block address parameter as the plurality of logical block addresses the garbage collection operation is performed on, and to skip the garbage collection operation for logical block addresses that exceed the logical block address corresponding to the logical block address parameter.

8. The computational storage device of claim 1, wherein the memory is configured to store file data input from the outside, and the user program is executed based on the file data.

9. The computational storage device of claim 8, wherein the memory comprises a computational program memory configured to store the file data and an internal memory configured to store the program slot.

10. A computational storage device comprising:
a nonvolatile memory configured to store data;
a storage controller configured to perform a storage function and to control a plurality of applications to be executed based on the data, wherein the storage function comprises writing data, reading data, and managing storage space of the nonvolatile memory; and
a processor configured to reconfigure an event handler according to an external command, control the event handler to identify an application among the plurality of applications according to an execution condition included in the external command and comprising a logical block address parameter, and execute the application for a plurality of logical block addresses filtered based on the logical block address parameter,
wherein the plurality of logical block addresses comprises logical block addresses that are less than a logical block address corresponding to the logical block address parameter,
wherein the storage controller is further configured to reconfigure the processor according to the external command, and
wherein the application is different from programs that perform the storage function of the storage controller.

11. The computational storage device of claim 10, wherein the processor is provided in the storage controller, and is further configured to drive an operating system to execute the application through the operating system.

12. The computational storage device of claim 11, wherein the storage controller further comprises a memory which comprises a program slot configured to store a user program executed by the operating system, and the processor is further configured to drive the operating system to execute the user program to control the application according to the execution condition.

13. The computational storage device of claim 12, wherein the user program is stored in the program slot based on the external command.

14. The computational storage device of claim 13, wherein the external command comprises a first external command for the user program and a second external command for the execution condition.

15. The computational storage device of claim 10, wherein the processor is further configured to identify the logical block addresses that are less than the logical block address corresponding to the logical block address parameter as the plurality of logical block addresses the application is performed on, and to skip the application for logical block addresses that exceed the logical block address corresponding to the logical block address parameter.

16. An electronic system comprising:
a nonvolatile memory configured to store data;
a storage controller which is configured to perform a storage function and comprises a processor and a memory comprising a program slot configured to store a user program executed by an internal operating system, wherein the storage function comprises writing data, reading data, and managing storage space of the nonvolatile memory; and
a host device configured to provide a download command for the user program to the storage controller,
wherein the internal operating system is configured to store the user program in the program slot based on the download command, execute the user program to control an application among a plurality of applications to perform a first operation on the data for a plurality of logical block addresses filtered based on a logical block address parameter,
wherein the plurality of logical block addresses comprises logical block addresses that are less than a logical block address corresponding to the logical block address parameter, and
wherein the application is different from programs that perform the storage function of the storage controller.

17. The electronic system of claim 16, wherein the host device is configured to provide an execution command, which comprises an execution condition for the first operation, to the storage controller after providing the download command, and the processor is further configured to control an event handler to identify the application from among the plurality of applications according to the execution condition, and
wherein the execution condition comprises the logical block address parameter.

18. The electronic system of claim 17, wherein the event handler is executed by the processor through the internal operating system.

19. The electronic system of claim 16, wherein the user program is stored in the program slot as an extended Berkeley Packet Filter (eBPF).

20. The electronic system of claim 16, wherein the processor is further configured to identify the logical block addresses that are less than the logical block address corresponding to the logical block address parameter as the plurality of logical block addresses the first operation is performed on, and to skip the first operation for logical block addresses that exceed the logical block address corresponding to the logical block address parameter.

* * * * *